(12) United States Patent
Kwatra (10) Patent No.: US 8,737,723 B1
(45) Date of Patent: May 27, 2014

(54) FAST RANDOMIZED MULTI-SCALE ENERGY MINIMIZATION FOR INFERRING DEPTH FROM STEREO IMAGE PAIRS

(75) Inventor: Vivek Kwatra, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 294 days.

(21) Appl. No.: 13/309,125

(22) Filed: Dec. 1, 2011

Related U.S. Application Data (60) Provisional application No. 61/421,602, filed on Dec. 9, 2010.

(51) Int. Cl.
| G06K 9/00 | (2006.01) |
| G06T 7/00 | (2006.01) |
| G06T 15/20 | (2011.01) |

(52) U.S. Cl.
CPC ............. *G06T 7/0075* (2013.01); *G06T 15/205* (2013.01)
USPC .......................................... 382/154; 345/419

(58) Field of Classification Search
USPC ......................................................... 382/154
See application file for complete search history.

(56) References Cited

U.S. PATENT DOCUMENTS

| 6,630,950 B1 | 10/2003 | Ohkawara et al. | |
| 6,750,974 B2 | 6/2004 | Svetkoff et al. | |
| 6,987,544 B2 | 1/2006 | Ogata et al. | |
| 6,993,167 B1 | 1/2006 | Skladnev et al. | |
| 7,026,830 B2 | 4/2006 | Shinada et al. | |
| 7,102,662 B2 | 9/2006 | Iida | |
| 7,440,610 B1 | 10/2008 | Wirtz et al. | |
| 7,463,816 B2 | 12/2008 | Tseng et al. | |
| 7,616,885 B2 * | 11/2009 | Chen et al. | 396/324 |
| 7,805,011 B2 | 9/2010 | Klamer et al. | |
| 8,350,932 B2 | 1/2013 | Iwasaki et al. | |
| 2005/0285874 A1 * | 12/2005 | Zitnick et al. | 345/592 |
| 2005/0285875 A1 * | 12/2005 | Kang et al. | 345/629 |
| 2005/0286759 A1 * | 12/2005 | Zitnick et al. | 382/154 |
| 2007/0024614 A1 * | 2/2007 | Tam et al. | 345/419 |
| 2007/0071311 A1 * | 3/2007 | Rovira-Mas et al. | 382/154 |
| 2008/0031327 A1 * | 2/2008 | Wang et al. | 375/240.12 |
| 2013/0250123 A1 * | 9/2013 | Zhang et al. | 348/164 |

OTHER PUBLICATIONS

Barnes, C., et al., "PatchMatch: A Randomized Correspondence Algorithm for Structural Image Editing," ACM Transactions on Graphics (Proc. SIGGRAPH), Aug. 2009, 10 pages.

GOOGLE, "Google building maker" 2011, 1 page [online][retrieved on May 31, 2012] Retrieved from the internet <URL:http://sketchup.google.com/3dwh/buildingmaker.html>.

\* cited by examiner

*Primary Examiner* — Hadi Akhavannik
(74) *Attorney, Agent, or Firm* — Fenwick & West LLP (57) ABSTRACT

An image processing module infers depth from a stereo image pair according to a multi-scale energy minimization process. A stereo image pair is progressively downsampled to generate a pyramid of downsampled image pairs of varying resolution. Starting with the coarsest downsampled image pair, a disparity map is generated that reflects displacement between corresponding pixels in the stereo image pair. The disparity map is then progressively upsampled. At each upsampling stage, the disparity labels are refined according to an energy function. The disparity labels provide depth information related to surfaces depicted in the stereo image pair.

36 Claims, 7 Drawing Sheets

FAST RANDOMIZED MULTI-SCALE ENERGY MINIMIZATION FOR INFERRING DEPTH FROM STEREO IMAGE PAIRS

CROSS-REFERENCE TO RELATED APPLICATION

This application claims the benefit of U.S. Provisional Application No. 61/421,602 entitled "Fast Randomized Multi-Scale Energy Minimization for Image Processing" filed on Dec. 9, 2010, which is incorporated by reference herein in its entirety.

This application is related to U.S. patent application Ser. No. 13/308,836 entitled "Fast Randomized Multi-Scale Energy Minimization for Image Processing" filed on Dec. 1, 2011, which is incorporated by reference herein in its entirety.

BACKGROUND

1. Field of the Invention

This invention generally relates to image processing and more specifically to inferring depth in stereo image pairs.

2. Description of the Related Art

Many current information systems store large quantities of digital images. For example, map applications often provide views of the surrounding area for a given map location and contain many images of streets and buildings. In some applications, three-dimensional images are included to provide depth information. This depth information enables construction of three-dimensional models of streets, buildings, or other objects that greatly enhance a user's experience.

For large-scale applications such as mapping, an automated technique for extracting depth information from images is highly desirable. Some image processing systems apply optimization techniques to automatically infer depth from stereo image pairs (i.e., "3D images"). However, these traditional techniques are very slow. Thus, there is a need for faster ways to infer depth from stereo image pairs.

SUMMARY

A first embodiment comprises a method for inferring depth from a stereo image pair comprising a first image and a second image. A low resolution version of the stereo image pair is generated. A low resolution disparity map is generated corresponding to the low resolution version of the stereo image pair. The low resolution disparity map comprises a set of labels with each label in the low resolution disparity map corresponding to a pixel position in the first image, and each label representing a displacement between the pixel position in the first image and a corresponding pixel position in the second image. A high resolution output disparity map is initialized using initial labels determined based on the set of labels in the low resolution disparity map. The high resolution output disparity map is refined to minimize an energy function. The high resolution output disparity map is stored to a storage medium. A depth of a surface depicted in the stereo image pair is determined using the disparity map.

A second embodiment comprises a non-transitory computer-readable storage medium storing computer executable computer program instructions for inferring depth from a stereo image pair comprising a first image and a second image. The computer program instructions comprise instructions for generating a low resolution disparity map corresponding to the low resolution version of the stereo image pair. The low resolution disparity map comprises a set of labels with each label in the low resolution disparity map corresponding to a pixel position in the first image, and each label representing a displacement between the pixel position in the first image and a corresponding pixel position in the second image. A high resolution output disparity map is initialized using initial labels determined based on the set of labels in the low resolution disparity map. The high resolution output disparity map is refined to minimize an energy function. The high resolution output disparity map is stored to a storage medium. A depth of a surface depicted in the stereo image pair is determined using the disparity map.

A third embodiment comprises a computer system for inferring depth from a stereo image pair comprising a first image and a second image. The computer system includes a computer-readable storage medium storing executable computer program instructions. The computer program instructions comprise instructions for generating a low resolution disparity map corresponding to the low resolution version of the stereo image pair. The low resolution disparity map comprises a set of labels with each label in the low resolution disparity map corresponding to a pixel position in the first image, and each label representing a displacement between the pixel position in the first image and a corresponding pixel position in the second image. A high resolution output disparity map is initialized using initial labels determined based on the set of labels in the low resolution disparity map. The high resolution output disparity map is refined to minimize an energy function. The high resolution output disparity map is stored to a storage medium. A depth of a surface depicted in the stereo image pair is determined using the disparity map. The computer system further comprises a processor configured to execute the computer program instructions stored on the computer-readable storage medium.

The figures depict embodiments for purposes of illustration only. One skilled in the art will readily recognize from the following description that alternative embodiments of the structures and methods illustrated herein may be employed without departing from the principles described herein.

DETAILED DESCRIPTION

Figure 1:
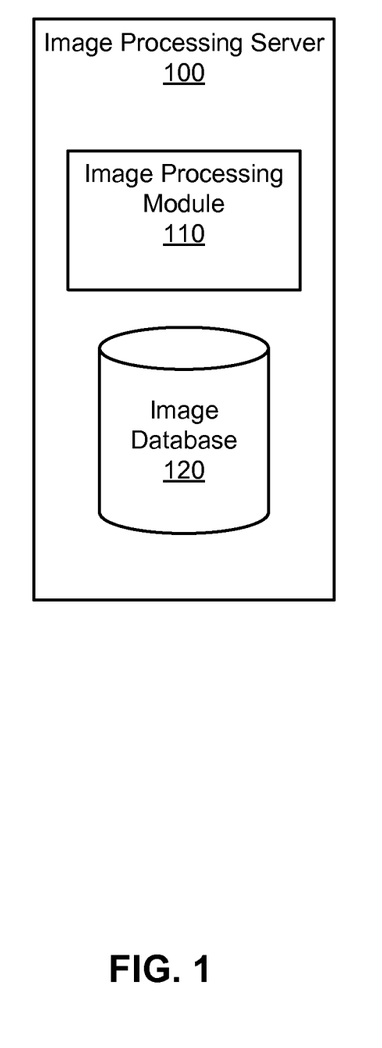
FIG. 1 is a high-level block diagram of an image processing server according to one embodiment.

FIG. 1 is a high-level block diagram of an image processing server 100 according to one embodiment. The server 100 includes an image processing module 110 and an image database 120. Only one server 100, image processing module 110, and image database 120 are shown in FIG. 1 in order to simplify and clarify the description. Embodiments can have multiple ones of these entities. Moreover, the entities can be distributed across multiple machines. For example, the image processing module 110 and database 120 can be distributed across multiple servers.

The image database 120 stores a set of "3D images." A 3D image comprises a stereo image pair in which a first image A and an second image B of the same object or scene are captured from slightly different (e.g., horizontally shifted) viewpoints. When viewed on specialized 3D displays (often including specialized 3D glasses) these 3D images create the visual illusion of depth. The term "image" as employed herein includes image data in general, such as individual still image files or frames from a video file. An individual image I (i.e., a 2D image) comprises a two-dimensional array of pixels. A particular pixel I(x,y) may be defined differently depending on the color space and encoding format. For example, in a RGB color space, a pixel may be defined as I(x,y)={R, G, B}, where R, G, and B are the intensity values of red, green, and blue respectively.

In one embodiment, the images in the image database 120 may be obtained from a variety of sources. In one particular embodiment, the images are obtained from an organization that produces aerial or street view images of a portion of a city for use with a map system, such as GOOGLE MAPS, GOOGLE STREET VIEW or GOOGLE EARTH. Likewise, images (including video frames) may be obtained from users, e.g. as submitted by a user uploading images to a photo repository such as PICASA WEB, or a video repository such as YOUTUBE or GOOGLE VIDEO.

The image processing module 110 processes stereo image pairs from the image database 120 to infer depth of various objects or surfaces depicted in the stereo image pair. The image processing module 110 infers depth by determining "disparity" between pixels in a first image A and "corresponding pixels" in a second image B in the stereo image pair. A pair of pixels from the first image A and second image B are "corresponding" if they depict same 3D location and thus have similar or identical appearance. The disparity represents the relative displacement between a given pixel in the first image A and its corresponding pixel in the second image B. This disparity arises because the first image A and second image B are taken from slightly different viewpoints. Once disparity is determined for a pair of corresponding pixels, the image processing module 110 can determine depth by triangulation and knowledge of the camera geometry (e.g., the distance between the lenses used to capture the stereo image pair).

The image processing module generates a "disparity map" representing the disparities between corresponding pixels in the first image and second images in the stereo image pair. For example, in one embodiment, a disparity map L comprises a two-dimensional array of "labels" where each label corresponds to a pixel position in the first image A, and each label represents the displacement from the pixel in the first image A to the corresponding pixel in the second image B. In one embodiment, the label is assumed to be a horizontal displacement and the label comprises a scalar value. In the more general case, the label can be a vector value representing horizontal and/or vertical displacement. In yet another embodiment, the label for a pixel position in image A can simply specify the absolute (x,y) location of the corresponding pixel in image B rather than specifying a relative location. Generally, the disparity map comprises labels showing how the second image can be reconstructed from the pixels in the first image under the assumption that corresponding pixels should appear similar.

The image processing module 110 chooses the corresponding pixels (and therefore the disparity labels) such that the labels minimize an energy (cost) function defined on the stereo image pair. Examples of energy functions will be described in further detail below.

Figure 2:
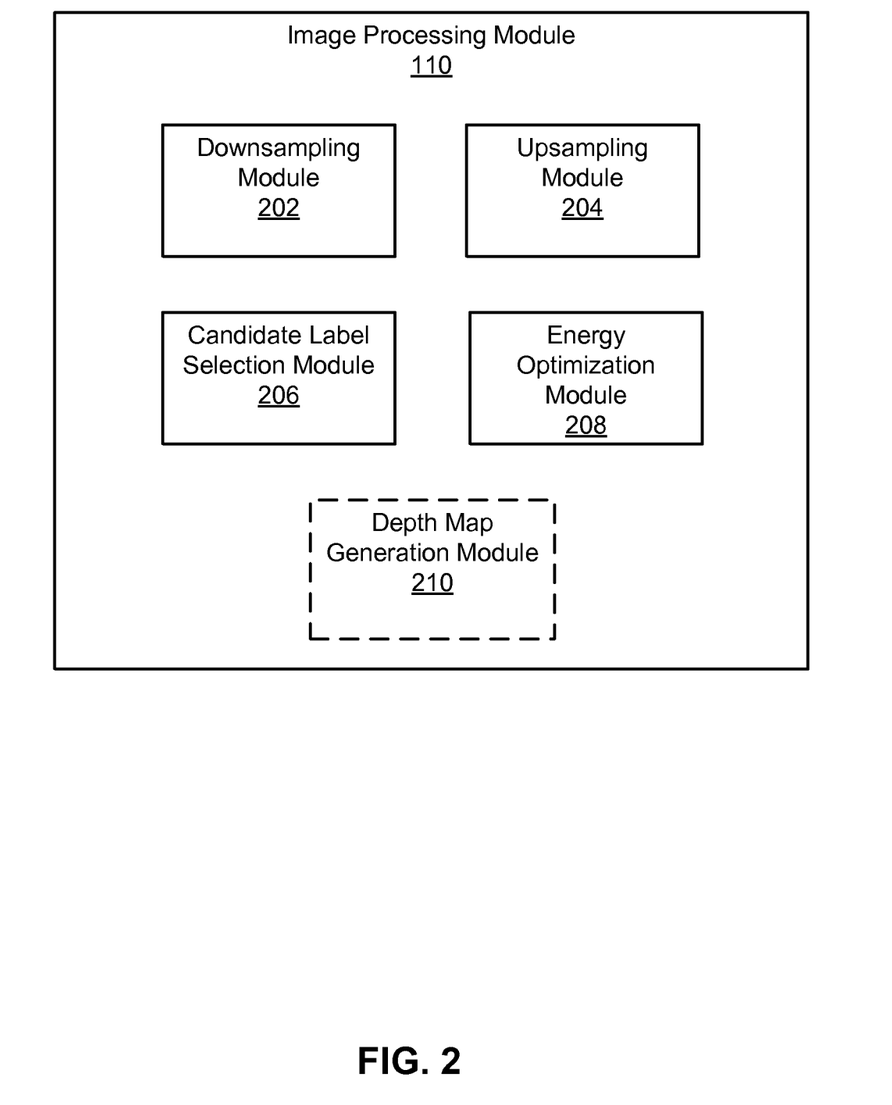
FIG. 2 is a block diagram of an image processing module according to one embodiment.

FIG. 2 is a block diagram of an example embodiment of the image processing module 110. The image processing module 110 comprises a downsampling module 202, an upsampling module 204, a candidate label selection module 206, an energy optimization module 208, and a depth map generation module 210. Alternative embodiments of the image processing module 110 have different and/or additional modules than the ones described here. Similarly, the functions can be distributed among the modules in a different manner than is described here.

The downsampling module 202 performs downsampling of an image to generate a lower resolution version of the image. In one embodiment, the downsampling module 202 further applies filtering to downsampled images in order to provide a smoother appearance to the downsampled image. The upsampling module 204 upsamples images to generate a higher resolution version of the image. In upsampling, an interpolation filter adds additional pixels to an image and infers their values in a manner that is visually consistent. In one embodiment, the upsampling module 204 upsamples disparity maps between two stereo images instead of operating directly on the images. In this embodiment, the upsampling module 204 generates a higher resolution disparity map from a lower resolution disparity map and infers the disparity label values based on the energy function.

The downsampling module 202 and upsampling module 204 may be utilized in a multi-scale process to enables fast minimization of the energy function. In the multi-scale process, the downsampling module 202 first progressively downsamples input image pairs to create a plurality of image pairs of varying resolution. The upsampling module 202 then progressively generates disparity maps for each downsampled image pair beginning with the coarsest image pair. At each stage, the disparity map is initialized based on the disparity labels from the previous lower resolution disparity map, and then iteratively refined to further improve the energy function. During this iterative process, the lower resolution disparity maps are used for only course-to-fine optimization of the final disparity map. Thus, in one embodiment, the "high resolution" output disparity map corresponds to the same resolution as the resolution of the original input image pair, and does not include new high resolution information (i.e., resolution information higher than the original resolution). The multi-scale minimization process will be described in further detail below with reference to FIGS. 4-5.

The candidate label selection module 206 applies various techniques to choose a set of candidate disparity labels for each pixel position in the disparity map. The candidate label selection module 206 may determine candidate disparity labels based on, for example, disparity labels for spatial neighbors, disparity labels for pixels having similar attributes (e.g., color), and/or a randomized function. The energy optimization module 208 applies an energy function to choose the candidate disparity label from the set of candidate disparity labels that best minimizes the energy function. Specific techniques for finding candidate disparity labels and selecting candidate disparity labels to minimize an energy function are described in further detail below.

The depth map generation module 210 optionally generates a depth map from the disparity map by applying triangulation to the disparities in the disparity map and using known geometry of the cameras used to capture the stereo images. The depth map provides, for a given pixel position in the 3D image, the inferred depth of the object or surface present at that pixel position. In one embodiment, the depth map generation module 210 may be omitted and the disparity map may instead be used directly.

Example processes for inferring depth from stereo image pairs are described in further detail below with reference to FIGS. 3-5.

Figure 3:
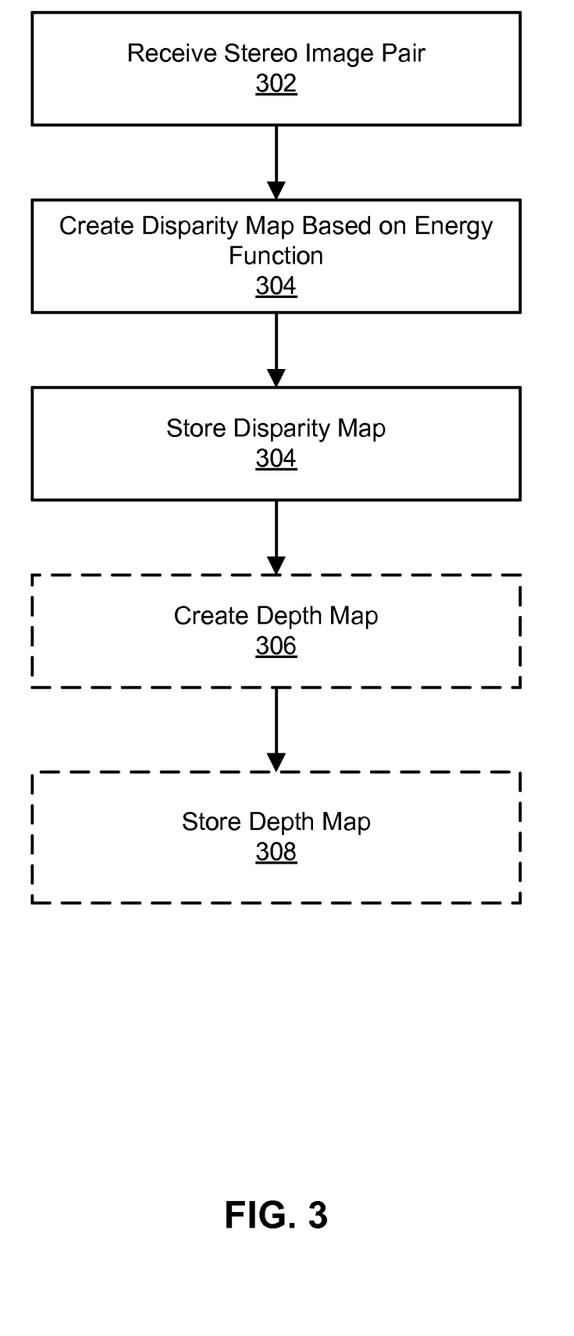
FIG. 3 is a flowchart illustrating a process for generating a disparity map from a stereo image pair according to one embodiment.

FIG. 3 illustrates an embodiment of a process for inferring depth from a stereo image pair. The image processing module 110 receives 302 a stereo image pair comprising a first image A and a second image B. The image processing module 110 then creates 304 a disparity map specifying the disparity labels for each pixel position. The disparity labels are chosen such that an energy function is minimized. Generally, the energy function decreases with better matching of corresponding pixels between the images. The disparity map is then stored 306 to a storage medium. Optionally, a depth map can also be created 308 from the disparity map (e.g., by triangulation) and stored 310 to a storage medium.

In one embodiment, an energy function E for a disparity map L is defined as:

$$E(L) = \sum_{p} DC(L_p) + \sum_{p,q} SC(L_p, L_q) \quad (1)$$

where $L_p$ is a disparity label for a pixel position p in a first image A of a stereo pair, $L_q$ is a disparity label for a pixel position q that is in the spatial neighborhood of p, DC is a data cost, and SC is a smoothness cost.

The data cost component $$\sum_{p} DC(L_p)$$

of the energy function sums data costs (DC) over all disparity labels $L_p$ in the disparity map. In one embodiment, the data cost (DC) for a particular disparity label $L_p$ is calculated as follows:

$$DC(L_p) = |A(p) - B(p + L_p)| \quad (2)$$

where A and B are the first and second images of the stereo image pair.

Thus, the data cost of a disparity label represents the difference between pixels designated as corresponding pixels by the disparity label. If $DC(L_p)$ is very low, for example, this means that pixels A(p) and B(p+$L_p$) are visually similar and are a good choice of corresponding pixels depicting the same 3D location, i.e., the disparity $L_p$ is a good estimate. If $DC(L_p)$ is very high, this means that pixels A(p) and B(p+$L_p$) are not visually similar and are less likely to correspond to the same 3D location, i.e., the disparity $L_p$ may be a poor estimate. Summing the data costs over all pixel positions p yields the overall data cost component for the disparity map representing an overall difference measure between the designated corresponding pixels in the stereo pair.

In another embodiment, the data cost function is instead defined as:

$$DC(L_p) = \min(|A(p) - B(p + L_p)|, \text{cutoff}) \quad (3)$$

where cutoff is a predefined value that may vary depending on the camera geometry, the image resolution, and other variable characteristics (and may be different than the cutoff value used in equation (5) below).

This data cost function improves robustness by taking occlusions into account. For example, if a pixel location becomes occluded in one of the images in the stereo pair, then there may be no disparity label $L_p$ that yields a low data cost. In this case, it is preferable to rely primarily on smoothness cost and prevent data cost from substantially influencing the overall energy function. Hence, in equation (3), a constant cutoff is used to limit the maximum value of the disparity label $L_p$.

The smoothness cost component $$\sum_{p,q} SC(L(p), L(q))$$

of energy function sums smoothness cost (SC) over all pairs of "neighboring" disparity labels in the label map (i.e., disparity labels $L_p$ and $L_q$ contribute to the smoothness cost only if p and q are neighbors). The set of pixels that are included in the neighborhood of a given pixel may vary with different implementations. For example, in one embodiment, the neighborhood of a given pixel comprises the four pixels spatially located directly to the left, to the right, above, and below the given pixel. In another embodiment, the neighborhood may also include pixels directly diagonal to the given pixel (eight neighboring pixels). In yet other embodiments, a larger radius may define the neighborhood (e.g., a two pixel or three pixel radius).

The smoothness cost measures the "seamlessness" (or lack of it) of the disparity labels across two neighboring positions p and q. In one embodiment, the smoothness cost (SC) is calculated as follows:

$$SC(L_p, L_q) = |L_p - L_q| \quad (4)$$

The smoothness cost represents the difference between disparities of neighboring pixel positions in the disparity map. The smoothness cost is based on the assumption that neighboring pixels are likely to belong to the same surface and are therefore likely to have the same or similar depth and disparity (assuming the surface is parallel to the viewing plane).

In one embodiment, the smoothness cost of equation (4) can be made more robust by further observing that if p and q come from different surfaces then their disparity should not necessarily be smooth. In one embodiment, this principle is applied by using a smoothness cost modeled as a robust cut-off function:

$$SC(L_p, L_q) = \min(|L_p - L_q|, \text{cutoff}) \quad (5)$$

where cutoff is a predefined value that may vary depending on the camera geometry, the image resolution, and other variable characteristics (and may be different than the cutoff value used in equation (3) above).

In another embodiment, the smoothness cost may be further modified to account for cases where the surface is not necessarily parallel to the viewing plane. If the surface is slanted relative to the viewing plane, then the disparities are expected to vary smoothly across pixel positions. For the case of a planar surface, this can be modeled as:

$$SC(L_p, L_q) = \min(|D(L_p) - D(L_q)|, \text{cutoff\_d}) \quad (6)$$

where cutoff_d is a predefined value that may vary depending on the camera geometry, the image resolution, and other variable characteristics. D is a differentiation or gradient operator, resulting in a 2-dimensional vector corresponding to gradients along the x and y axes. For example, in one embodiment, the function D is defined as follows:

$$D(L_{x,y}) = \begin{bmatrix} L_{x,y} - L_{x-1,y} \\ L_{x,y} - L_{x,y-1} \end{bmatrix} \quad (7)$$

In yet another embodiment, the smoothness cost in equation (6) can be generalized to higher order gradients to account for non-planar surfaces. For example, in one embodiment, the smoothness cost is defined as:

$$SC(L_p, L_q) = \quad (8)$$
$$w_0 * \min(|L_p - L_q|, \text{cutoff}) + w_1 * \min(|D(L_p) - D(L_q)|, \text{cutoff\_d}) +$$
$$w_2 * \min(|D(D(L_p)) - D(D(L_q))|, \text{cutoff\_d2}) + \ldots$$

where $w_i$ is the weight for the i-th order gradient cost.

In one embodiment, the process of generating the disparity map can be performed efficiently using an iterative approach. In this approach, the disparity map is first initialized using a set of initial disparity labels. The initial disparity labels may be assigned according to a random process, according to predefined values (e.g., zero), or according to multi-scale process that is described in further detail below. Once all pixel positions are initialized with an initial disparity label, the image processing module 110 then iteratively refines the disparity labels by finding new disparity labels that further minimize the energy function. For example, in one embodiment, the image processing module 110 refines the disparity labels by processing each pixel position one at a time (e.g., in a raster scan order). In the refinement steps, the image processing module 110 first determines a set of candidate disparity labels S[p] for the pixel position p. Then, the image processing module 110 selects the candidate disparity label that will best minimize the energy function.

Candidate Disparity Label Selection

In one embodiment, candidate disparity labels can be determined using either a randomization technique (i.e., randomized candidates), a spatial coherence technique (i.e., spatial coherence candidates), a signal coherence technique (i.e., signal coherence candidates) or combination of the above techniques. The candidate label selection module 206 selects randomized candidates according to a function having some random component. For example, in one embodiment, the candidate label selection module 206 selects a random set of "valid" disparity labels within a radius of the current disparity label $L_p$, where a valid disparity label is one that implicates a pixel position within the boundaries of the second image B, i.e., for a pixel position p in a first image A, $p+L_p$ is within the boundaries of image B. A randomized candidate label $L_r$ may be given by $L_r=L_p+\text{rand}(-r, r)$, where rand(-r, r) provides a random number between -r and r. The radius and/or number of candidates may be predefined constants. In another embodiment, a weighted randomized function may be used that weights likelihoods of selecting a particular pixel location based on distance. Thus, for example, disparity labels closer to current disparity label may be more likely to be selected than those farther away. These randomized candidates are included in the candidate set S[p].

To find spatial coherence candidates, the candidate disparity label selection module 206 generates spatial candidate disparity labels based on disparity labels assigned to neighboring positions to the position p. This process selects candidates that are likely to minimize smoothness cost. For example, in one embodiment, the image processing module 110 first finds spatial coherence candidates based on the $0^{th}$ order smoothness cost component of equation (8). This step simply finds the disparity labels associated with neighboring pixels and adds these disparity labels to the candidate set, i.e., a $0^{th}$ order spatial coherence candidates $L_{c0}$ for a position p is given by $L_{c0}=L_q$ where q is a spatial neighbor of p. Next, the image processing module 110 finds spatial coherence candidates based on the $1^{st}$ order smoothness cost component of equation (8). For example, in one embodiment, a gradient of a neighboring pixel q is created as $G_q=D(L_q)$ using equation (7) above. Then, a first order spatial coherence candidate $L_{c1}$ for a position p is given by $L_{c1}=L_q+G_q*(p-q)$. In one embodiment, the $1^{st}$ order candidate label $L_a$ is only computed if $G_q$ is less than a predefined gradient threshold, thus ensuring that p and q are actually part of the same surface. Higher order spatial coherence candidates may be similarly computed. Valid spatial coherence candidates (i.e., those that implicate pixel locations within the image boundaries) are included in the candidate set S[p] together with the randomized labels.

To find signal coherence candidates, the image processing module 110 may first pre-process the stereo image pair to identify pixels having similar pixel values (e.g., colors intensities) or gradients. Pixels that fall within a certain threshold similarity of each other are identified as "signal neighbors." For example, in one embodiment, the image processing module 110 determines signal neighbors by binning the colors and gradients into a histogram and considering all pixels in the same bin to be neighbors. Signal coherence candidates can then be selected in the same manner as described above for spatial coherence candidates, except that pixels q within the signal neighborhood of a pixel p are considered instead of pixels within the spatial neighborhood.

The energy minimization module 208 then determines which of the candidate labels S[p] will minimize the energy function. In one embodiment, the image processing module 110 performs a fixed number of iterations (e.g., 5-10 iterations) with each iteration seeking to further improve the energy function. Alternatively, the image processing module 110 may continue iterating until a particular criterion is met (e.g., the energy cost falls below a threshold or the incremental improvement in energy cost falls below a threshold).

Multi-Scale Energy Minimization

Figure 4A:
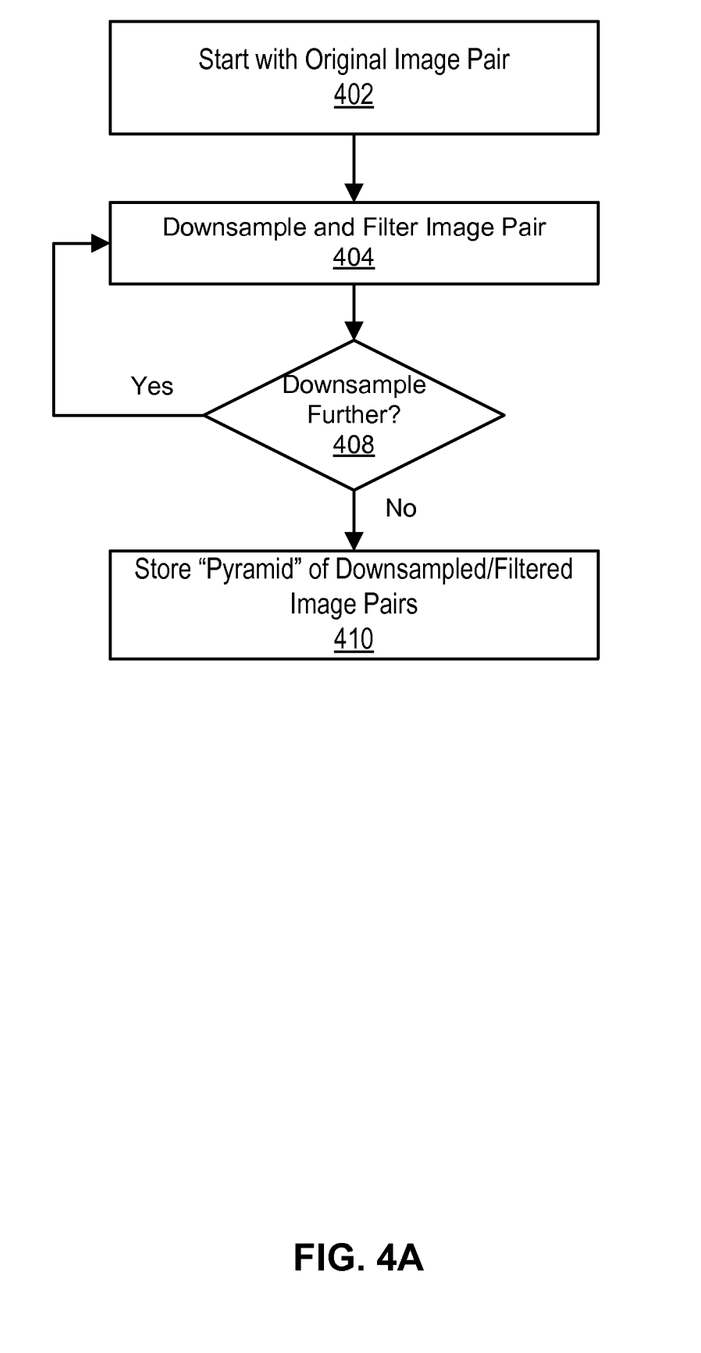
FIG. 4A is a flowchart illustrating a downsampling phase of a multi-scale energy minimization process according to one embodiment.
Figure 4B:
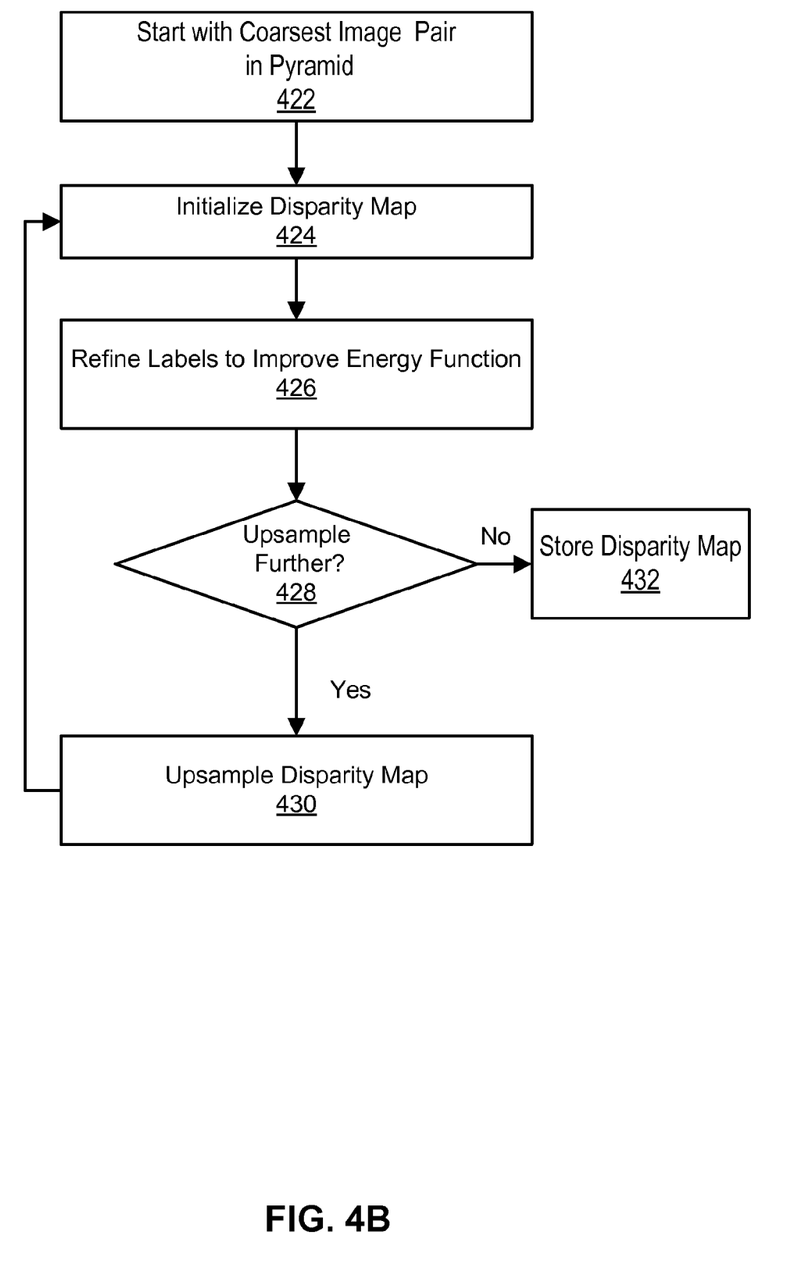
FIG. 4B is a flowchart illustrating an upsampling phase of a multi-scale energy minimization process according to one embodiment.

FIGS. 4A and 4B are flowcharts illustrating an embodiment of a process of creating the disparity map using a multi-scale implementation to initialize the disparity labels.

FIG. 4A illustrates a downsampling, or pre-processing, phase of the multi-scale process. In the downsampling phase, the image processing module 110 progressively downsamples (via the downsampling module 202) and filters the original stereo image pair to create "pyramids" of downsampled/filtered images of varying resolution. The downsampling phase starts 402 with the original stereo image pair. The image processing module 110 downsamples and filters 404 the stereo image pair. In one embodiment, downsampling comprises removing selected pixels from each image depending on the downsampling factor. For example, to downsample by a factor of two, the image processing module 110 removes every second row and column of each image. In alternative embodiments, a different downsampling factor may be used. Filtering is applied to smooth the pixels that still remain after downsampling. In one embodiment, each pixel in the downsampled image is assigned a value that is an average of the corresponding pixel in the pre-downsampled image and its "neighboring" pixels in the pre-downsampled image. The set of neighboring pixels may be defined in different ways according to different embodiments and is not necessarily defined in the same way as the neighborhood used to calculate the smoothness cost discussed above. For example, in one embodiment, the neighboring pixels of a given pixel include pixels directly above, below, to the left and to the right of the given pixel (if within the boundaries of the image). In another embodiment, the neighboring pixels may also include pixels directly diagonal from a given pixel. In yet other embodiment, neighboring pixels may include pixels not directly adjacent to a given pixel (e.g., within a two or three pixel radius).

The image processing module 110 then determines 408 whether to downsample further. This may be determined, for example, based on a stopping criterion such as the downsampled image reaching a particular size. In one embodiment, the image processing module 110 continues downsampling until the image size reaches a single pixel. If the image processing module 110 determines to downsample further, the process loops back to step 404 and iterates again. If the image processing module 110 determines to stop downsampling (e.g., when the images are dowsampled to a single pixel), then the image processing module 110 stores the "pyramids" 410 of successively downsampled and filtered images (each having a different resolution).

FIG. 4B, illustrates an embodiment of an upsampling phase of the multiscale process. In this phase, the image processing module 110 generates a series of disparity maps from each of the downsampled image pairs in the downsampling pyramids by progressively upsampling (via the upsampling module 204) the disparity maps. For example, in one embodiment, the image processing module 110 starts 422 with the coarsest image pair in the pyramids of downsampled images. In one embodiment, each image in the coarsest image pair may comprise only a single pixel. The image processing module initializes 424 a disparity map having dimensions equivalent to the dimensions of the coarsest images. If the coarsest images are only a single pixel, this step 424 is trivial as the disparity map comprises only a single disparity label that must be zero (i.e., there is no offset because the downsampled first image A and second image B each comprise only a single pixel). In subsequent stages, initial disparity labels are determined based on the disparity map for the previous lower resolution image pair in the downsampling pyramids. For example, in one embodiment, labels for the previous low resolution disparity map are first scaled based on the upsampling factor to generate disparity labels for the higher resolution disparity map. For example, assuming an upsampling factor of 2, disparity labels for pixel positions having even row and columns in the higher resolution disparity map are first initialized as:

$$\text{HighRes\_}L(2p)=2*\text{LowRes\_}L(p) \quad (9)$$

where HighRes_L is the disparity map currently being initialized and LowRes_L is the lower resolution disparity map created in the previous iteration of the multi-scale process.

Then, the remaining positions added during upsampling (having an odd row and/or column) in the high resolution disparity map are initialized with disparity labels that are the same as the disparity label for an adjacent position. Thus, for example, in one embodiment, disparity labels for odd rows and/or columns are initialized as:

$$\text{HighRes\_}L(2p+\text{offset})=2*\text{LowRes\_}L(p)+\text{offset} \quad (10)$$

for offset values of (0,1), (1,0), or (1,1). Using the initialization equations above, some disparity labels may initialize to invalid disparity values (e.g., implicating pixel locations that are outside the image boundaries). To prevent this, disparity labels that would be initialized to invalid values may instead be projected to valid values (e.g., the closest valid values). The equations above may be modified for different upsampling factors.

After initialization, the image processing module 110 then refines 426 the disparity labels as described above in order to improve the energy function (e.g., by generating a set of candidate labels for each pixel position and selecting the candidate label that best minimizes the energy function). As described above, the refinement step 426 may iterate multiple times at each stage of the pyramids.

The image processing module 110 then determines 428 whether or not to upsample further by, for example, checking if a stopping criterion is met. For example, in one embodiment, the stopping criterion is met when the disparity map reaches a size equal to the original image size. If the image processing module 110 determines to upsample further, the disparity map is upsampled 430 to create a new disparity map having dimensions equivalent to the dimensions of the next largest image pair in the pyramids. If the image processing module 110 determines not to upsample further (e.g., because the original image size is reached), the image processing module 110 stores 432 a disparity map having the same dimensions as the original image pair.

Figure 5:
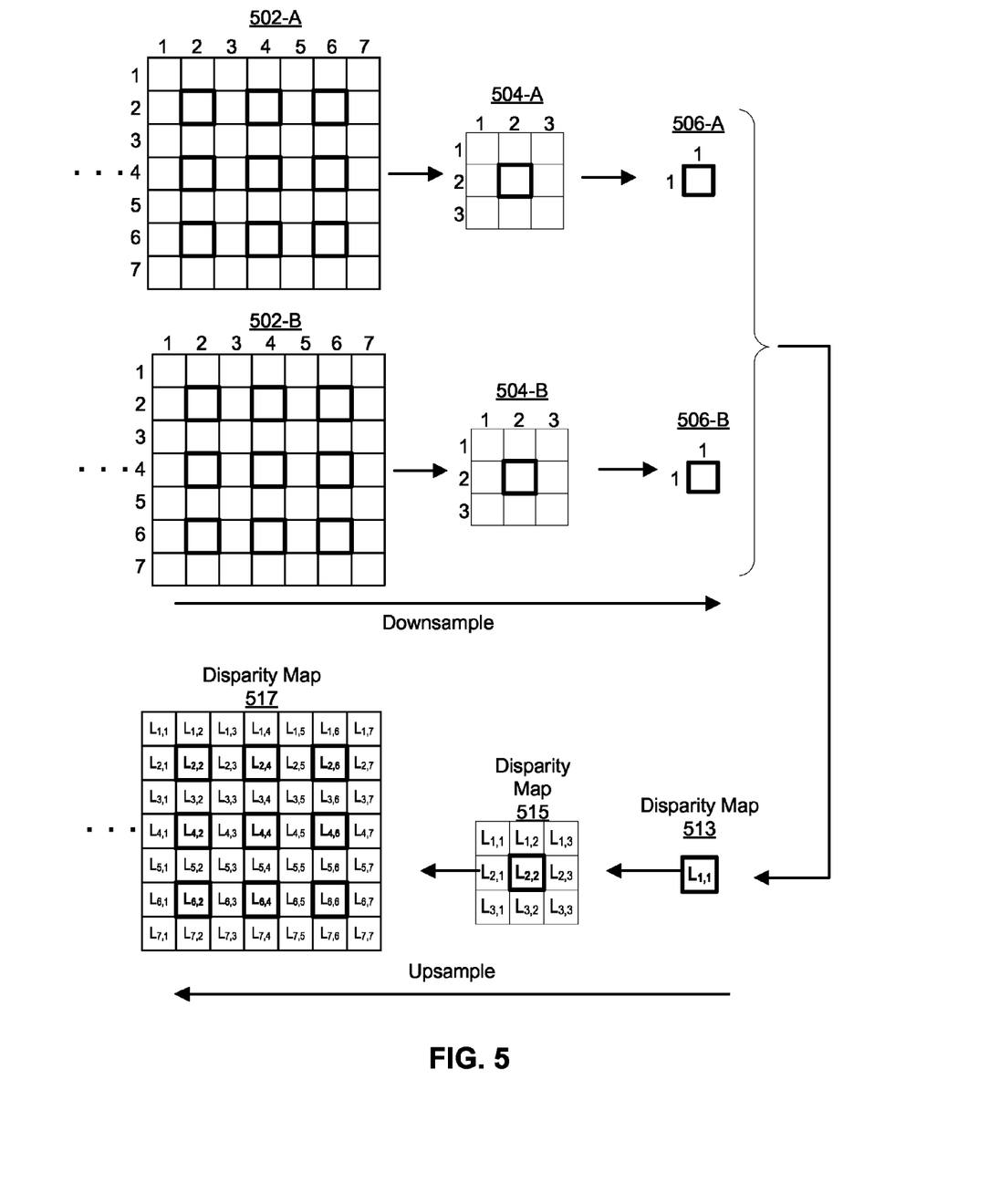
FIG. 5 is a diagram illustrating a set of example images and corresponding disparity maps according to one embodiment.

FIG. 5 illustrates several example stages of the multi-scale process described in FIGS. 4A-4B. Specifically, FIG. 5 illustrates the last three iterations of the downsampling phase of FIG. 4A and the first three iterations of the upsampling phase of FIG. 4B. The downsampled images 502-A, 502-B (collectively referenced as images 502) each comprise a 7×7 array of pixels. The images 502 are downsampled by removing the odd rows and columns, thus leaving only the pixels outlined in bold. This results in the 3×3 images 504. For a given pixel in images 504, the pixel value is set by computing an average of the corresponding pixel in images 502 and its neighboring pixels, with the neighborhood being defined in this example as a one pixel radius (including diagonal pixels, excluding hole pixels or positions outside the image boundary. The images 504 is then downsampled and filtered again, resulting in the single pixels 506.

In the upsampling phase, a disparity map 513 is first generated corresponding to images 506. Because the disparity map 513 at this stage is 1×1, this step is trivial and the disparity map initializes to zero, i.e. $L_{1,1}=0$. Next the disparity map 513 is upsampled to the size of image 504. Disparity labels are then generated corresponding to each pixel by first initializing the disparity label based on the previous lower resolution label map, and then iteratively refining the disparity labels to minimize the energy function. The disparity map 515 is then upsampled again and new disparity labels are generated to generate the disparity map 517. This process continues until a disparity map of the original image size is reached.

A benefit of the multi-scale process described process is that the energy function need not be explicitly computed for all possible combinations of disparity labels. Unlike some traditional techniques, the above described implementation does not necessarily perform an explicit "nearest neighbor search." Rather, each stage just determines a disparity label map that best improves the previous labeling in terms of data and smoothness costs while satisfying boundary constraints. While this is a greedy approach, the use of a multi-scale pyramid alleviates the problem by taking long-range interactions into account at the coarser level.

Computer Architecture

Figure 6:
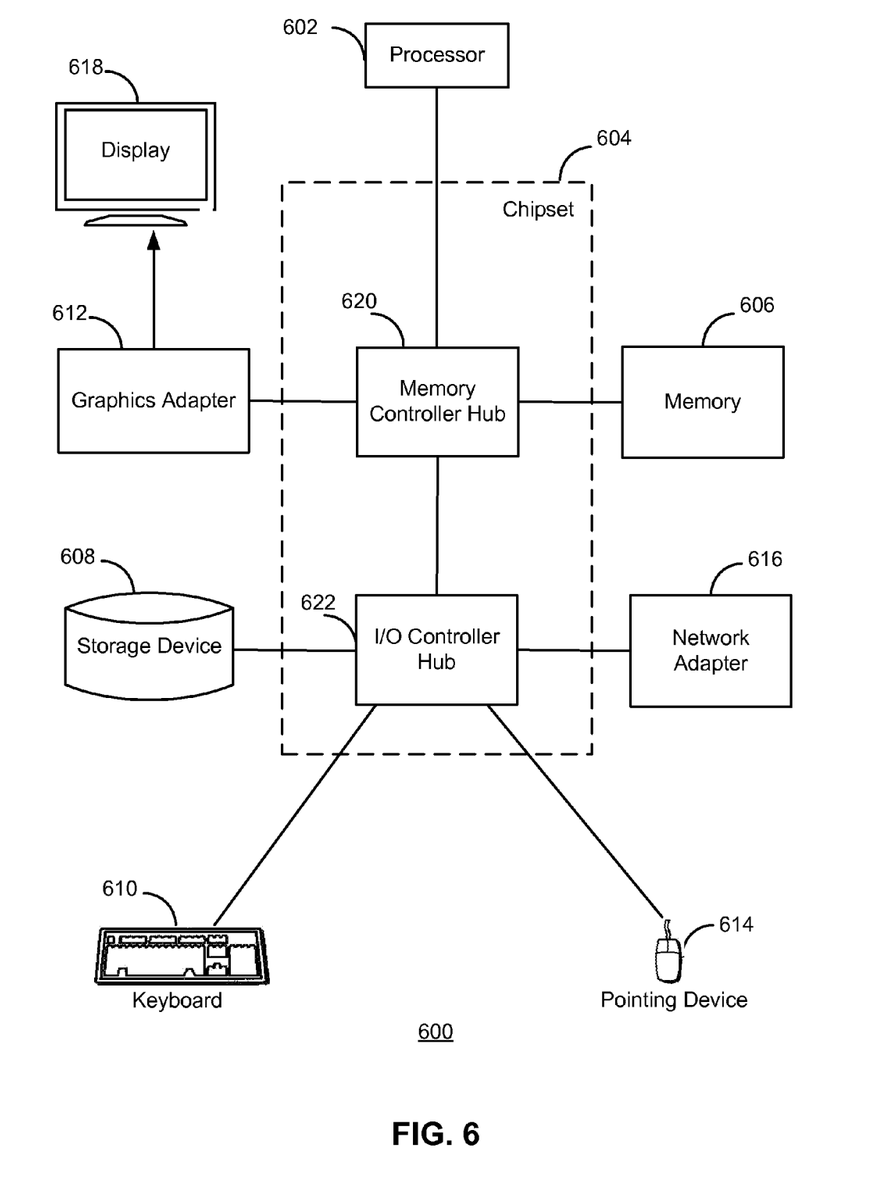
FIG. 6 is a computer for use as the image processing server according to one embodiment.

FIG. 6 is a high-level block diagram illustrating an example of a computer 600 for use as an image processing server 100. Illustrated are at least one processor 602 coupled to a chipset 604. The chipset 604 includes a memory controller hub 620 and an input/output (I/O) controller hub 622. A memory 606 and a graphics adapter 612 are coupled to the memory controller hub 620, and a display device 618 is coupled to the graphics adapter 612. A storage device 608, keyboard 610, pointing device 614, and network adapter 616 are coupled to the I/O controller hub 622. Other embodiments of the computer 600 have different architectures. For example, the memory 606 is directly coupled to the processor 602 in some embodiments.

The storage device 608 is a non-transitory computer-readable storage medium such as a hard drive, compact disk read-only memory (CD-ROM), DVD, or a solid-state memory device. The memory 606 holds instructions and data used by the processor 602. The pointing device 614 is a mouse, track ball, or other type of pointing device, and is used in combination with the keyboard 610 to input data into the computer 600. The graphics adapter 612 displays images and other information on the display device 618. The network adapter 616 couples the computer 600 to a network. Some embodiments of the computer 600 have different and/or other components than those shown in FIG. 6. The types of computer 600 can vary depending upon the embodiment and the desired processing power. The computer 600 may comprise multiple blade servers working together to provide the functionality described herein.

The computer 600 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 608, loaded into the memory 606, and executed by the processor 602.

The above description is included to illustrate the operation of the embodiments and is not meant to limit the scope of the invention. From the above discussion, many variations will be apparent to one skilled in the relevant art that would yet be encompassed by the spirit and scope of the invention.

The invention claimed is:

1. A computer-implemented method for inferring depth from a stereo image pair comprising a first image and a second image, the method comprising:

generating a low resolution version of the stereo image pair;

generating a low resolution disparity map corresponding to the low resolution version of the stereo image pair, the low resolution disparity map comprising a set of labels with each label in the low resolution disparity map corresponding to a pixel position in the first image and each label representing a displacement between the pixel position in the first image and a corresponding pixel position in the second image;

initializing a high resolution output disparity map using initial labels determined based on the set of labels in the low resolution disparity map;

refining the high resolution output disparity map to minimize an energy function;

storing the high resolution output disparity map to a storage medium; and determining depth of a surface depicted in the stereo image pair using the high resolution output disparity map.

2. The computer-implemented method of claim 1, further comprising:

applying triangulation to the high resolution output disparity map to generate a depth map representing an estimated depth depicted by each pixel in the stereo image pair; and storing the depth map to the storage medium.

3. The computer-implemented method claim 1, wherein the energy function comprises a data cost component set representing a difference in pixel values between pixels in the first image and their respective corresponding pixels in the second image specified by the high resolution output disparity map.

4. The computer-implemented method of claim 1, wherein the energy function comprises a smoothness cost component representing similarity between labels associated with neighboring pixel positions in the stereo image pair.

5. The method of claim 4, wherein the smoothness cost component comprises a sum of smoothness costs between neighboring pixel positions, and wherein a smoothness cost between a pair of neighboring pixels comprises a lesser of a difference between disparities of the neighboring pixels and a predefined cutoff value.

6. The method of claim 5, wherein the difference between the disparities of the neighboring pixels comprises a difference in gradients between the disparities of the neighboring pixels.

7. The computer-implemented method of claim 1, wherein refining the high resolution output disparity map to minimize the energy function comprises:

determining, for a given pixel position in the high resolution output disparity map, a set of candidate labels for the given pixel position;

determining, for each candidate label in the set of candidate labels, a contribution to the energy function; and selecting the candidate label for the given pixel position that will best minimize the energy function.

8. The computer-implemented method of claim 7, wherein determining the set of candidate labels comprises:

determining randomized candidate labels selected according to a function having a random component.

9. The computer-implemented method of claim 7, wherein determining the set of candidate labels comprises:

determining spatial coherence candidate labels selected based on labels assigned to spatial neighbors of the given pixel position.

10. The computer-implemented method of claim 7, wherein determining the set of candidate labels comprises:

determining signal coherence candidate labels selected based on labels assigned to signal neighbors of the given pixel position, wherein the signal neighbors comprise pixels within a threshold similarity to the given pixel.

11. The computer-implemented method of claim 1, wherein initializing the high resolution output disparity map using the initial labels comprises:
upsampling the low resolution disparity map corresponding to the low resolution version of the stereo image pair.

12. The computer-implemented method of claim 1, further comprising:
pre-processing the stereo image pair to generate a plurality of downsampled image pairs of varying resolutions including the low resolution version of the stereo image pair, wherein a coarsest downsampled image pair comprises a pair of single pixels.

13. A non-transitory computer-readable storage medium storing executable computer program instructions for inferring depth from a stereo image pair comprising a first image and a second image, the computer program instructions comprising instructions for:
generating a low resolution version of the stereo image pair;
generating a low resolution disparity map corresponding to the low resolution version of the stereo image pair, the low resolution disparity map comprising a set of labels with each label in the low resolution disparity map corresponding to a pixel position in the first image and each label representing a displacement between the pixel position in the first image and a corresponding pixel position in the second image;
initializing a high resolution output disparity map using initial labels determined based on the set of labels in the low resolution disparity map;
refining the high resolution output disparity map to minimize an energy function;
storing the high resolution output disparity map to a storage medium; and
determining depth of a surface depicted in the stereo image pair using the high resolution output disparity map.

14. The computer-readable storage medium of claim 13, further comprising instructions for:
applying triangulation to the high resolution output disparity map to generate a depth map representing an estimated depth depicted by each pixel in the stereo image pair; and
storing the depth map to the storage medium.

15. The computer-readable storage medium of claim 13, wherein the energy function comprises a data cost component set representing a difference in pixel values between pixels in the first image and their respective corresponding pixels in the second image specified by the high resolution output disparity map.

16. The computer-readable storage medium of claim 13, wherein the energy function comprises a smoothness cost component representing similarity between labels associated with neighboring pixel positions in the stereo image pair.

17. The computer-readable storage medium claim 16, wherein the smoothness cost component comprises a sum of smoothness costs between neighboring pixel positions, and wherein a smoothness cost between a pair of neighboring pixels comprises a lesser of a difference between disparities of the neighboring pixels and a predefined cutoff value.

18. The computer-readable storage medium of claim 17, wherein the difference between the disparities of the neighboring pixels comprises a difference in gradients between the disparities of the neighboring pixels.

19. The computer-readable storage medium of claim 13, wherein refining the high resolution output disparity map to minimize the energy function comprises:
determining, for a given pixel position in the high resolution output disparity map, a set of candidate labels for the given pixel position;
determining, for each candidate label in the set of candidate labels, a contribution to the energy function; and
selecting the candidate label for the given pixel position that will best minimize the energy function.

20. The computer-implemented method of claim 19, wherein determining the set of candidate labels comprises:
determining randomized candidate labels selected according to a function having a random component.

21. The computer-readable storage medium of claim 19, wherein determining the set of candidate labels comprises:
determining spatial coherence candidate labels selected based on labels assigned to spatial neighbors of the given pixel position.

22. The computer-readable storage medium of claim 19, wherein determining the set of candidate labels comprises:
determining signal coherence candidate labels selected based on labels assigned to signal neighbors of the given pixel position, wherein the signal neighbors comprise pixels within a threshold similarity to the given pixel.

23. The computer-readable storage medium of claim 13, wherein initializing the high resolution output disparity map using the initial labels comprises:
upsampling the low resolution disparity map corresponding to the low resolution version of the stereo image pair.

24. The computer-readable storage medium of claim 13, further comprising:
pre-processing the stereo image pair to generate a plurality of downsampled image pairs of varying resolutions including the low resolution version of the stereo image pair, wherein a coarsest downsampled image pair comprises a pair of single pixels.

25. A computer system for inferring depth from a stereo image pair comprising a first image and a second image, the computer system comprising:
a non-transitory computer-readable storage medium storing executable computer program instructions, the computer program instructions comprising instructions for:
generating a low resolution version of the stereo image pair;
generating a low resolution disparity map corresponding to the low resolution version of the stereo image pair, the low resolution disparity map comprising a set of labels with each label in the low resolution disparity map corresponding to a pixel position in the first image and each label representing a displacement between the pixel position in the first image and a corresponding pixel position in the second image;
initializing a high resolution output disparity map using initial labels determined based on the set of labels in the low resolution disparity map;
refining the high resolution output disparity map to minimize an energy function;
storing the high resolution output disparity map to a storage medium; and
determining depth of a surface depicted in the stereo image pair using the high resolution output disparity map; and
a processor configured to execute the computer program instructions stored on the computer-readable storage medium.

26. The computer system of claim 25, wherein the computer-readable storage medium further comprises instructions for:
- applying triangulation to the high resolution output disparity map to generate a depth map representing an estimated depth depicted by each pixel in the stereo image pair; and
- storing the high resolution depth map to the storage medium.

27. The computer system of claim 25, wherein the energy function comprises a data cost component set representing a difference in pixel values between pixels in the first image and their respective corresponding pixels in the second image specified by the high resolution output disparity map.

28. The computer system of claim 25, wherein the energy function comprises a smoothness cost component representing similarity between labels associated with neighboring pixel positions in the stereo image pair.

29. The computer system claim 28, wherein the smoothness cost component comprises a sum of smoothness costs between neighboring pixel positions, and wherein a smoothness cost between a pair of neighboring pixels comprises a lesser of a difference between disparities of the neighboring pixels and a predefined cutoff value.

30. The computer system of claim 29, wherein the difference between the disparities of the neighboring pixels comprises a difference in gradients between the disparities of the neighboring pixels.

31. The computer system of claim 28, wherein refining the high resolution output disparity map to minimize the energy function comprises:
- determining, for a given pixel position in the high resolution output disparity map, a set of candidate labels for the given pixel position;
- determining, for each candidate label in the set of candidate labels, a contribution to the energy function; and
- selecting the candidate label for the given pixel position that will best minimize the energy function.

32. The computer system of claim 31, wherein determining the set of candidate labels comprises:
- determining randomized candidate labels selected according to a function having a random component.

33. The computer system of claim 31, wherein determining the set of candidate labels comprises:
- determining spatial coherence candidate labels selected based on labels assigned to spatial neighbors of the given pixel position.

34. The computer system of claim 31, wherein determining the set of candidate labels comprises:
- determining signal coherence candidate labels selected based on labels assigned to signal neighbors of the given pixel position, wherein the signal neighbors comprise pixels within a threshold similarity to the given pixel.

35. The computer system of claim 25, wherein initializing the high resolution output disparity map using the initial labels comprises:
- upsampling the low resolution disparity map corresponding to the low resolution version of the stereo image pair.

36. The computer system of claim 25, further comprising:
- pre-processing the stereo image pair to generate a plurality of downsampled image pairs of varying resolutions including the low resolution version of the stereo image pair, wherein a coarsest downsampled image pair comprises a pair of single pixels.

* * * * *